(12) United States Patent
Lee et al.

(10) Patent No.: US 9,164,596 B1
(45) Date of Patent: Oct. 20, 2015

(54) METHOD AND APPARATUS FOR GESTURE INTERACTION WITH A PHOTO-ACTIVE PAINTED SURFACE

(71) Applicant: Google Inc., Mountain View, CA (US)

(72) Inventors: Johnny Lee, Mountain View, CA (US); Eric Teller, Palo Alto, CA (US); William Graham Patrick, San Francisco, CA (US); Eric Peeters, Mountain View, CA (US)

(73) Assignee: Google Inc., Mountain View, CA (US)

( * ) Notice: Subject to any disclaimer, the term of this patent is extended or adjusted under 35 U.S.C. 154(b) by 318 days.

(21) Appl. No.: 13/657,363

(22) Filed: Oct. 22, 2012

(51) Int. Cl.
*G06F 3/0354* (2013.01)
*G06F 3/0488* (2013.01)
*H04M 1/2755* (2006.01)

(52) U.S. Cl.
CPC .......... *G06F 3/0354* (2013.01); *G06F 3/04883* (2013.01); *H04M 1/2755* (2013.01)

(58) Field of Classification Search
CPC . G06F 3/0354; G06F 3/04883; H04M 1/2755
USPC ........................................................ 345/158
See application file for complete search history.

(56) References Cited

U.S. PATENT DOCUMENTS

| 5,319,747 | A | 6/1994 | Gerrissen et al. |
| 6,256,033 | B1 | 7/2001 | Nguyen |
| 6,840,627 | B2 | 1/2005 | Olbrich |
| 7,259,747 | B2 | 8/2007 | Bell |
| 7,611,396 | B2 | 11/2009 | Schnuckle |
| 8,237,654 | B2 | 8/2012 | Kang |
| 8,603,723 | B2 | 12/2013 | Chang et al. |
| 8,730,183 | B2 * | 5/2014 | Lundback et al. ............ 345/173 |
| 2001/0012001 | A1 * | 8/2001 | Rekimoto et al. ............ 345/173 |
| 2004/0205394 | A1 | 10/2004 | Plutowski |
| 2005/0094109 | A1 * | 5/2005 | Sun et al. ......................... 353/79 |
| 2006/0007188 | A1 * | 1/2006 | Reiner ........................... 345/179 |
| 2006/0026521 | A1 * | 2/2006 | Hotelling et al. .............. 715/702 |
| 2006/0259184 | A1 * | 11/2006 | Hayes et al. .................. 700/221 |
| 2007/0139367 | A1 * | 6/2007 | Goffin ............................ 345/156 |

(Continued)

FOREIGN PATENT DOCUMENTS

EP   1591984 A2   11/2005

OTHER PUBLICATIONS

"Zombie-licious: Making Monsters with Lasers and Glow Paint," <http://gajitz.com/zombie-licious-making-monsters-with-lasers-and-glow-paint/>, Printed Aug. 6, 2012, 3 pages.

*Primary Examiner* — Ariel Balaoing
(74) *Attorney, Agent, or Firm* — Blakely Sokoloff Taylor & Zafman LLP

(57) ABSTRACT

A method and apparatus for gesture interaction with a photo-active painted surface is described. The method may include driving a spatial electromagnetic modulator to emit electromagnetic stimulation in the form of an image to cause photo-active paint to display the image. The method may also include capturing, with at least a camera of a painted surface display system, image data of the image displayed on the photo-active paint applied to a surface and a user motion performed relative to the image. The method may also include analyzing the captured image data to determine a sequence of one or more physical movements of the user relative to the image displayed on the photo-active paint. The method may also include determining, based on the analysis, that the user motion is indicative of a gesture, and driving the spatial electromagnetic modulator to update.

20 Claims, 6 Drawing Sheets

(56) References Cited

U.S. PATENT DOCUMENTS

| | | |
|---|---|---|
| 2007/0150953 A1 | 6/2007 | Hamid et al. |
| 2007/0285399 A1* | 12/2007 | Lund .............................. 345/173 |
| 2008/0004953 A1 | 1/2008 | Ma et al. |
| 2010/0160041 A1 | 6/2010 | Grant et al. |
| 2011/0161998 A1 | 6/2011 | Alberth et al. |
| 2012/0050687 A1* | 3/2012 | Berry et al. ..................... 353/10 |
| 2012/0154511 A1* | 6/2012 | Hsu et al. ................... 348/14.03 |
| 2012/0218417 A1 | 8/2012 | Bilger et al. |
| 2013/0050258 A1 | 2/2013 | Liu et al. |

* cited by examiner

METHOD AND APPARATUS FOR GESTURE INTERACTION WITH A PHOTO-ACTIVE PAINTED SURFACE

TECHNICAL FIELD

Embodiments of the invention relate to the field of large-scale display systems, and more particularly, to the generation of large-scale displays.

BACKGROUND

Large wall displays can be prohibitively expensive as the cost to manufacture display panels rises exponentially with display area. This exponential rise in cost arises from the increased complexity of large monolithic displays, the decrease in yields associated with large displays (a greater number of components must be defect free for large displays), and increased shipping, delivery, and setup costs. The exponential rise in cost also includes the energy requirements associated with large wall displays. As a result, typical large wall displays are impractical for personal or home usage.

SUMMARY

A method and apparatus for gesture interaction with a photo-active painted surface is described. According to an exemplary method, a spatial electromagnetic modulator is driven to emit electromagnetic stimulation in the form of an image to cause the photo-active paint to display the image. In one embodiment, image data of the image displayed on photo-active paint applied to the surface and a user motion performed relative to the image are captured, with at least a camera of a painted surface display system. Furthermore, in one embodiment, the captured image data is analyzed to determine a sequence of one or more physical movements of the user relative to the image displayed on the photo-active paint. In one embodiment, based on the analysis, that the user motion is indicative of a gesture, the spatial electromagnetic modulator is driven to generate an update to the image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
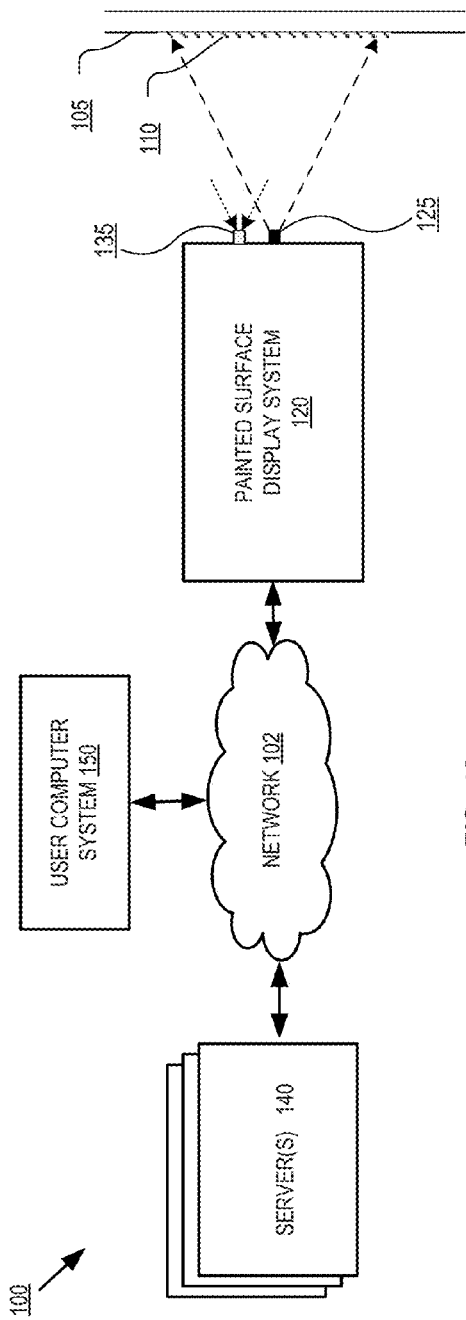
FIG. 1A is a block diagram of exemplary system architecture for enabling gesture interaction with a painted surface display system.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "determining", "analyzing", "driving", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1A is a block diagram of exemplary system architecture 100 for enabling gesture interaction with a painted surface display system. In one embodiment, the system 100 includes painted surface display system (PSDS) 120, user computer system 150, and one or more server(s) 140. In one embodiment, PSDS 120, user computer system 150, and server(s) 140 may be computing devices, such as a desktop computer, laptop computer, personal digital assistant, tablet computer, a mobile telephone, a cellular communication enabled wearable device, etc. In one embodiment, PSDS 120 is a web-enabled self-contained computing device.

In one embodiment, audio-visual inputs/sensor inputs 135 and a spatial electromagnetic (EM) modulator 125 are coupled with PSDS 120. Although only a single PSDS 120 and user computer system 150 are illustrated, in the embodiments discussed herein, a plurality of PSDSs 120 and/or a plurality of user computer systems 150 may be deployed to support gesture interaction on painted surfaces as discussed below.

The PSDS 120, user computer system 150, and server(s) 140 may be coupled to a network 102 that communicates any of the standard protocols for the exchange of information. In one embodiment, user computer system 150 and PSDS 120 may be coupled with network 102 via a wireless connection, such as a cellular telephone connection, wireless fidelity connection, etc. The PSDS 120, user computer system 150, and server(s) 140 may run on one Local Area Network (LAN) and may be incorporated into the same physical or logical system, or different physical or logical systems. Alternatively, the PSDS 120, user computer system 150, and server(s) 140 may reside on different LANs, wide area networks, cellular telephone networks, etc. that may be coupled together via the Internet but separated by firewalls, routers, and/or other network devices. It should be noted that various other network configurations can be used including, for example, hosted configurations, distributed configurations, centralized configurations, etc.

Figure 1B:
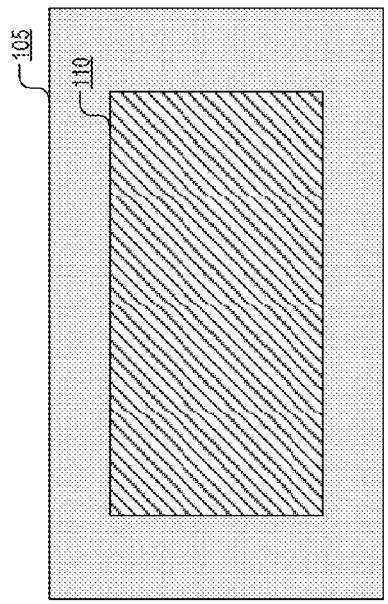
FIG. 1B illustrates a perspective view of a surface painted with a photo-active paint.

In one embodiment, PSDS 120 enables the display of images and/or videos on a painted surface. In one embodiment, a surface 105, such as a wall, floor, ceiling, surface of an object, etc. within the real world, is painted with a photo-active paint 110. In one embodiment, the photo-active paint is stimulated by light of one or more particular wavelengths that displays an image in response to illumination. In one embodiment, the photo-active paint is stimulated by heat generated, for example, by a laser, by an electron beam, etc. by PSDS 120. FIG. 1B illustrates another perspective of surface 105 painted with a photo-active paint 110. The photo-active paint 110 may be a photo-luminescent paintable material that emits visible spectrum light in response to one or more of electromagnetic stimulation on a photo-chromic paintable material and temperature stimulation on a thermo-chromic paintable material that changes light absorption/reflection properties in response to the electromagnetic stimulation. These photo-active paints are available from companies such DuPont™, 3M™, and others.

In one embodiment, and as discussed in greater detail below, PSDS 120 includes a spatial electromagnetic EM modulator 125 and a display engine (not shown) coupled to drive the spatial EM modulator 125 with an image. In one embodiment, PSDS 120 includes also includes an AV/sensor input 135 to capture image, sound, temperature, light, etc. data for analysis. In one embodiment, the analysis of the input data is provided as feedback to the display engine which further drives spatial electromagnetic EM modulator 125 to update the image generated by spatial electromagnetic EM modulator 125.

In one embodiment, PSDS 120 may be positioned remotely relative to surface 105 with a line of sight view of photo-active paint 110 painted on the surface 105. For example, PSDS 120 may be mounted on a ceiling, back wall, or shelf. In one embodiment, during operation of the PSDS 120, spatial EM modulator 125 illuminates paint 110 with an image and/or video. Spatial EM modulator 125 may emit photons at different wavelengths (e.g., UV or visible spectrum), or emit electrons, in the form of an image, video, or pattern for illuminating paint 110.

If paint 110 is a photo-luminescent material, then the image illuminated onto paint 110 will cause paint 110 to re-emit photons in a pattern indicative of the image output by spatial EM modulator 125 of PSDS 120. In some embodiments, the response time of paint 110 is quick enough to facilitate video images, or slow enough to display still images for finite periods of time. The still images may be refreshed periodically with the same image or a new image, thereby providing a low power display surface.

If paint 110 is a photo-chromic material, then illumination by spatial EM modulator 125 of PSDS 120 causes paint 110 to alter its light absorbing/reflecting properties. For example, the illuminated regions of paint 110 may change color. If photo-chromic paint is illuminated with an image, then the image is displayed on surface 105. Again, the response time of paint 210 may be quick enough to facilitate video images, or slow enough to display still images for finite periods of time. The still images may be refreshed periodically with the same image or a new image, thereby providing a low power display surface. In one embodiment, photo-active paint 110 is a bi-stable e-ink, which can be made to change between one of two colors via appropriate illumination by spatial EM modulator 125. In one embodiment, photo-active paint 110 may be a tri-stable system, of a plurality of regions of the paint that include 3 color patches (one each of R, G, and B) in each region to show mainly one of those colors In one embodiment, PSDS 120 may output a registration pattern onto paint 110, which AV/sensor input 135 then captures. The captured image and sensor data is analyzed by PSDS 120 to determine the size of area painted on surface 105, properties of the painted surface (i.e., refresh rate, photo-sensitivity, imaging quality capabilities, color display capabilities, etc.), which is then used to adjust the zoom, size, video frame rate, etc. of the images and/or videos output from PSDS 120. If a user repaints surface 105 with a larger or smaller painted area 110, repaints surface 105 with a different photo-active paint, or positions PSDS 120 relative to a different painted surface (not shown), then PSDS 120 can be recalibrated. Additionally, if surface 105 is painted with a slow response photo-active paint 110, PSDS 120 may monitor the image as it fades and determine the appropriate refresh rate and duty cycle for operating a display engine that drives EM modulator 125.

In one embodiment, photo-active paint 110 is a pixilated layout of multiple different photo-active paints, each having a different spectral response to illumination. For example three different R, G, B photo-active paints may be applied to surface 105 in a pixilated grid. When the R-type photo-active paint is illuminated, it subsequently emits or reflects red light for a period of time, when the G photo-active paint is illuminated, it subsequently emits or reflects green light for a period of time, and when the B-type photo-active paint is illuminated, it subsequently emits or reflects blue light for a period of time. By aligning or timing the EM stimulation from EM modulator 125 of PSDS 120 with the color grid painted surface, the appearance of color images and videos may be created. Of course, other color combinations, or even gray scale paints may be used.

It should be appreciated that surface 105, as illustrated in FIGS. 1A and 1B need not be just a wall. Rather, any surface (flat or curved) may be coated with photo-active paint 110 and become a blank canvas upon which image and videos may be displayed and updated at will. Furthermore, in the embodiments discussed herein, photo-active paint 110 may be transparent or translucent in an unexcited state, and then become darker or emit photons in an excited state (i.e., when stimulated by light, heat, etc.). The translucent or transparent photo-active paint could be applied to surface 105 when it is desirable for surface 105 to remain visible under the paint.

In one embodiment, EM modulator 125 displays a user interactive image on painted surface 105. In one embodiment, a user may interact with the image through gestures that the user makes near the image and/or while facing the image displayed on photo-active paint 110 applied to surface 105. In one embodiment, audio-visual inputs/sensor inputs 135 of PSDS 120 capture image or video data with, for example, a camera system mounted in the PSDS 120 and pointed towards photo-active paint 110 on surface 105. As discussed in greater detail below, PSDS 120 may analyze the captured image or video data by performing one or more computer vision processes, such as face recognition to identify specific users, motion and object recognition to determine when a user approaches surface 105, gesture recognition to differentiate between different user gestures and a location the gestures are performed relative to painted surface 105, etc.

In one embodiment, PSDS 120 performs image analysis to recognize and process user gesture interaction, such as hand, body, and eye gesture interaction, with images displayed on the photo-active paint 110 applied to surface 105. For example, when PSDS 120 displays pages of a book with photo-active paint 110 on surface 105, a user may interact with controls that are displayed on photo-active paint 110 along with the book. These controls may include, for example, widgets for turning a page of the book, in which case PSDS 120 would cause photo-active paint to display a new page of the book, widgets for bookmarking the book, widgets for opening or closing different books, etc.

In one embodiment, PSDS 120 enables users to interact with a photo-active painted surface with different types of gestures. In one embodiment, PSDS 120 supports one or more of formal gestures, trained gestures, natural gestures, and user interface control gestures. In one embodiment, a formal gesture is a gesture that is pre-set in PSDS 120 and a user learns to perform the gesture (e.g., a zoom gesture, a minimize gesture, a close application gesture, etc.). In one embodiment, a trained gesture is a gesture that a user teaches the PSDS 120 to recognize. That is, the user performs a new gesture one or more times to PSDS 120 until PSDS 120 is able to differentiate the created gesture from other gestures, such as other formal, natural gestures, trained gestures, and user interface control gestures. In one embodiment, the user then explains (e.g., via a keyboard in communication with PSDS 120) what the new trained gesture denotes and what actions or processes the new trained gesture is associated with (e.g., waving hands above head="display all emergency contact numbers large on the wall"). In one embodiment, a natural gesture is a subset of the formal gesture type, but is a gesture that a user would learn from the real world, and which is processed accordingly by the PSDS 120. For example, a user understands a light switch gesture as flipping a switch. In this example, when a user approaches painted surface 105, the user may perform a flip-switch motion on an empty space on painted surface 105. PSDS 120 would recognize the natural gesture as a commonly understood sequence of motions, and perform the associated action (e.g., turn on lights in a room). Finally, in one embodiment, a user interface control gesture is a gesture in which a user interacts with controls drawn onto photo-active paint by PSDS 120. Continuing the light switch example, PSDS 120 may draw a light switch control on photo-active paint 110. A user may then approach the drawn on light switch image generated by PSDS 120, and perform the switch motion, similar to that discussed with respect to the nature gestures. However, PSDS 120 could interpret the switch gesture in the context of the drawn on control and, for example, turn the power on for a device specified by the control (e.g., power on a television, power on exterior lighting, etc.). Although different types of gestures and examples of those gestures are discussed herein, PSDS 120 is not limited to the recognition and processing of specific gesture types.

In one embodiment, user interface control gestures are analyzed, recognized, and processed relative to controls drawn on the photo-active paint 110 applied to surface 105. In one embodiment, the controls drawn on the photo-active paint 110 may be drawn to appear in various locations on the painted surface 105, enlarge when a user approaches the controls, present different controls to different users (i.e., from face, voice, or other forms of user identification), etc. In one embodiment, presentation of controls by PSDS 120 is based on a determined context associated with a user. In one embodiment, the controls may automatically be generated and displayed on photo-active paint 110 when a user is determined to be proximate to surface 105, as well as based on a determined pose and attention relative to surface 105. Furthermore, different controls may be associated with different locations of surface 105 (i.e., a first location on surface 105 is associated with a radio control panel, a second location on surface 105 is associated with a room lighting control panel, a third location on surface 105 is associated with text entry, etc.), so that as a user is determined by PSDS 120 to approach a specific location relative to photo-active painted surface 105, PSDS 120 may automatically display the associated controls on photo-active paint 110 applied to surface 105. In one embodiment, different control systems may be displayed by PSDS 120 in response to detection of associated gestures (i.e., a first user gesture is associated media center control panel, a second gesture is associated text entry control panel). In yet another embodiment, user preferences may define what controls are displayed on surface 105 when a specific user is determined by PSDS 120 to approach surface 105. These preferences may be defined directly through an interface generated and displayed by PSDS 120, or remotely by receipt of user preferences from user computer system 150.

In one embodiment, PSDS 120 is web enabled so that it may communicate over network 102 with one more connected systems, such as server(s) 140. In one embodiment, server(s) 140 may receive input, commands, or other data entered via an interface displayed by PSDS 120. As discussed herein, the input, commands, or other day are obtained by PSDS 120 through gesture recognition performed by PSDS 120 in response to detection of user gestures performed proximate to surface 105. In one embodiment, the input obtained by PSDS 120 and transmitted to server(s) 140 may be data entry, such as alphanumeric entry for which PSDS 120 performs optical character recognition on text entry gestures performed by a user. In one embodiment, the data entry may be performed with a virtual whiteboard or graffiti application displayed by PSDS 120 on photo-active painted surface 105. However, instead of physically writing on surface 105, PSDS 120 recognizes hand gestures, such as text entry, save, erase, move, and other functions associated with the alphanumeric entry. In one embodiment, PSDS 120 performs optical character recognition on the gestures to persist an image of the user's text entry on photo-active paint 110, and optionally recognize and replace the text entry with a clean type font of the alphanumeric entry. In one embodiment, similar processes may be performed by PSDS 120 in response to user graffiti art. For example, user drawing gestures may be determined by PSDS 120 to indicate a user is drawing a circle. PSDS 120 could then replace the hand-drawn circle image with the image of a perfect circle. In one embodiment, text and drawing recognition results may be sent to remote server(s) 140 from PSDS 120 for storage or as input to a remote system, such as server(s) 140 or user computer system 150.

In one embodiment, a user need not be proximate to surface 105 in order to interact with PSDS 120. In one embodiment, a user may deploy a handheld EM modulator (not shown) to draw, write, or perform gestures on photo-active paint 110. In one embodiment, the handheld EM modulator would cause a change in the chemistry of photo-active paint 110 thereby creating an image on photo-active paint 110. In one embodiment, audio-visual/sensor input capture by PSDS 120 would capture the drawings, and process them in accordance with the discussion herein as alphanumeric entry, gestures, etc.

Figure 2:
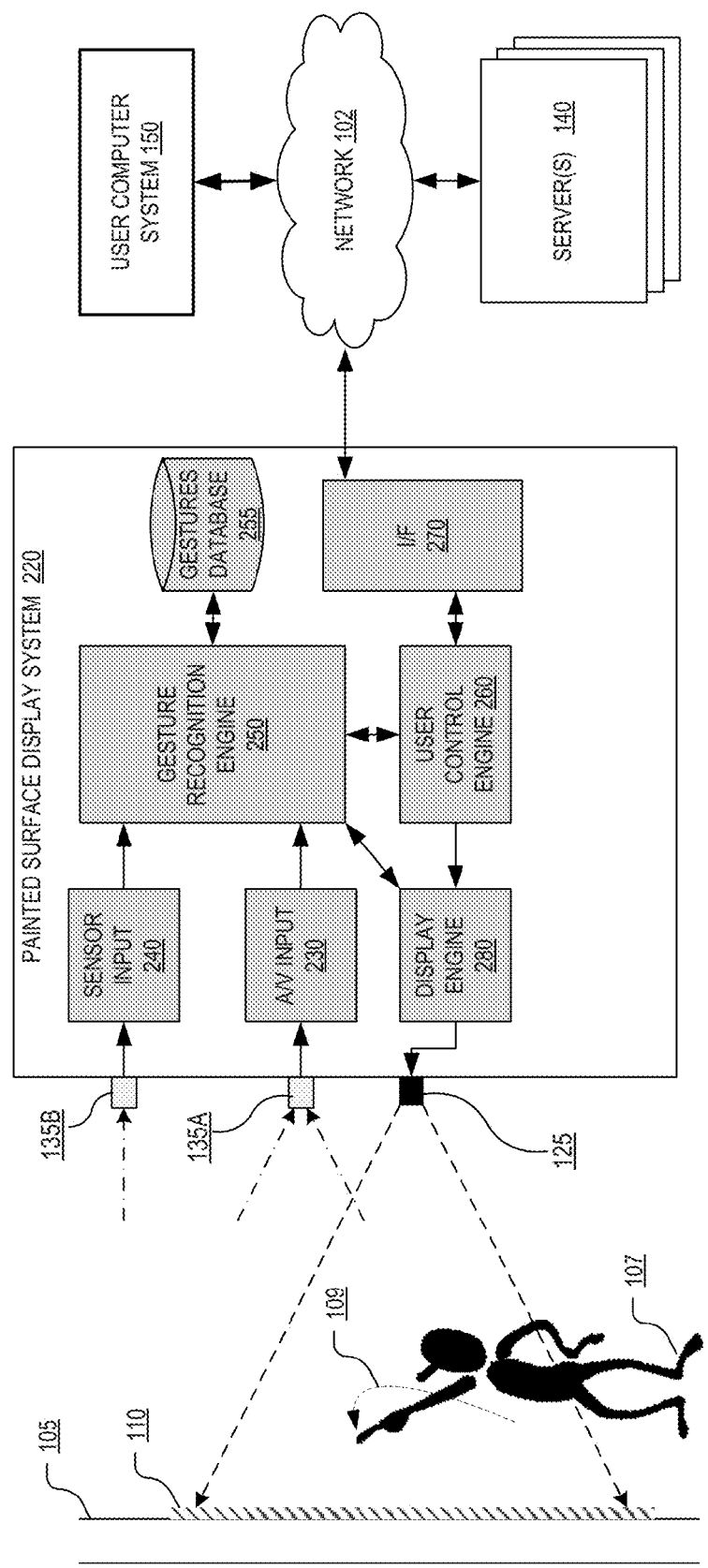
FIG. 2 is a block diagram of one embodiment of painted surface display system.

FIG. 2 is a block diagram of one embodiment 220 of painted surface display system (PSDS). PSDS 220, as illustrated in FIG. 2, provides additional details for the PSDS 120 discussed above in FIG. 1A.

In one embodiment, PSDS 220 may include one or more sensors 135B coupled with a sensor input 240, one or more audio-visual (A/V) capture devices 135A (e.g., a camera, microphone, etc.) coupled with A/V input 230, gesture recognition engine 250, a gesture database 255, a web enabled interface (I/F) 270, a user control engine 260, and a display engine 280 coupled with a spatial electromagnetic EM modulator 125. In one embodiment, the PSDS 220, user computer system 150, and server(s) 140 communicate with each other over various networks and network configurations as discussed above in FIG. 1A. Furthermore, in one embodiment, PSDS 220 may be coupled with user computer system 150 by wired, wireless, or near filed communication connection.

In one embodiment, A/V input 230 receives audiovisual data from A/V capture devices 135A. The audiovisual data may include images, video, sound, etc. In one embodiment, the audiovisual data is provided to gesture recognition engine 250. Furthermore, sensor input 240 receives sensor input data from sensors 135B, such as light data, humidity data, temperature data, wind speed, ambient noise level, etc.

The audiovisual data and sensor data is received by gesture recognition engine 250. In one embodiment, gesture recognition engine 250 performs one or more computer vision processes, such as image recognition, face recognition, motion recognition, etc., on the received audiovisual and sensor data to identify users that may be proximate to surface 105, detect gestures that a user may be making (e.g., gesture 109 performed by user 107), and identify any potential detected gestures based on gestures motion signatures stored within gesture database 255. In one embodiment, the gestures identifiable by gesture recognition engine 250, and for which motion signatures are stored within gesture database 255, may include formal gestures, trained gestures, natural gesture, and user interface control gestures.

In one embodiment, in order for gesture recognition engine 250 to differentiate between different gestures, and to determine whether or not to process those gestures, gesture recognition engine 250 also analyzes the audiovisual data and sensor data to determine a user context associated with a potential gesture. In one embodiment, the context may include an identity of a user, a user's proximity to surface 105, a user's determined posture and attention relative to the surface 105, a user's proximity to different areas of surface (i.e., where different areas are associated with different controls), etc.

In one embodiment, the analysis of a user's motion and context enable gesture recognition engine 250 to determine whether or not a gesture has, or may, been performed by a user. As discussed herein, the determined gesture might indicate alphanumeric entry on a photo-active painted surface 105, command entry into a displayed control panel, gestures that enable user interaction with an image displayed on photo-active paint 110 (e.g., turning the pages of a displayed book), etc. Furthermore, gesture recognition engine 250 may determine that, from analysis of the audiovisual data, a context associated with a user indicates the user may perform a gesture. For example, gesture recognition engine 250 may determine that a user's motion indicates they are moving toward wall 105, and their posture and attention are directed towards wall 105.

In one embodiment, gesture recognition engine 250 informs user control engine 260 that a specific gesture has been performed or that a user may perform a gesture in the future. In one embodiment, when user control engine 260 receives an indication that a user may perform a gesture, user control engine 260 determines whether to display a user interface control panel. As discussed in the examples above, as a user approaches a location on surface 105, user control panel may determine to display and/or enlarge an existing control panel at the location as the user approaches the control panel. Furthermore, if a user approaches different location on surface 105 associated with different control panels, user control engine 260 could determine which specific user interface control panel to display.

In one embodiment, when gesture recognition engine 250 determines that a user has performed a gesture, user control engine 260 receives an indication that a user has performed a gesture and data relevant to the gesture performed. In one embodiment, user control panel 260 utilizes the gesture data (i.e., a command, alphanumeric data entry, etc.) to transmit data for the gesture to a connected system, such as one of server(s) 140. In one embodiment, user control engine 260 further utilizes gesture data (i.e., a command, alphanumeric data entry, etc.) to generate or update an image/video data being displayed by photo-active paint 110.

In one embodiment, display engine 280 receives a command from user control engine 260 as to what controls, user data, etc. are to be displayed or refreshed. Display engine 280 is coupled with the spatial EM modulator 125 to drive EM modulator 125 to display the one or more images and/or videos. As discussed above, the images and videos generated and displayed by PSDS 220 enable a user to interact with PSDS 220 or connected systems, such as server(s) 140, via gestures.

Figure 3:
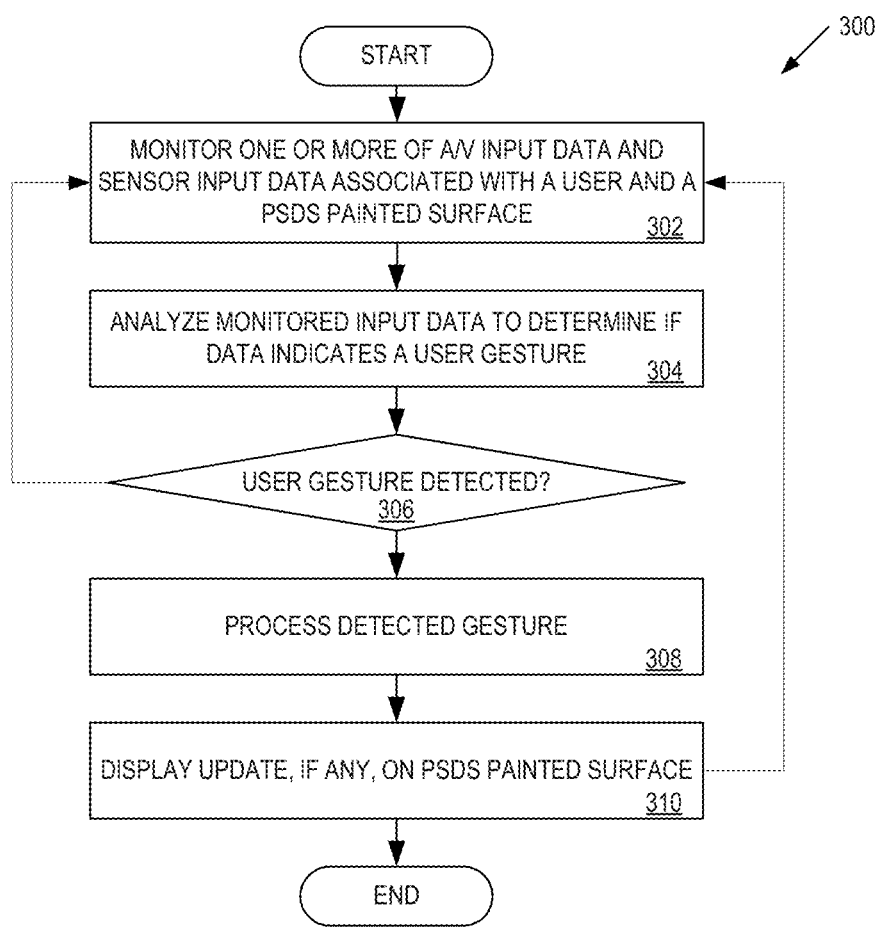
FIG. 3 is a flow diagram of one embodiment of a method for gesture recognition in a painted surface display system.

FIG. 3 is a flow diagram of one embodiment of a method 300 for gesture recognition in a painted surface display system. The method 300 is performed by processing logic that may comprise hardware (circuitry, dedicated logic, etc.), software (such as is run on a general purpose computer system or a dedicated machine), firmware, or a combination. In one embodiment, the method 300 is performed by PSDS 120 or PSDS 220.

Referring to FIG. 3, processing logic begins by monitoring one or more of A/V input data and sensor data associated with a user and a PSDS painted surface (processing block 302). In one embodiment, processing logic monitors one or more of audio data, visual data, and sensor data with respect to a surface painted with photo-active paint. In one embodiment, the monitored data may include different users and movements/gestures performed by the users relative to the surface.

Processing logic analyzes the monitored input data to determine if a user has performed a gesture relevant to the photo-active painted surface (processing block 304). In one embodiment, processing logic utilizes the monitored data to determine a context within which a potential gesture has been performed. In one embodiment, processing logic performs one or more computer vision processes on the monitored data to recognize and identify information within the monitored data. For example, processing logic may perform one or more of voice recognition, image recognition, motion recognition, etc. to identify specific users that are proximate to painted surface, whether their movement, pose, and attention is directed to or away from the painted surface, determining when an identified user is approaching the painted surface, etc. The analysis performed by processing logic generates a real-world context where a user's motion can be interpreted.

When processing logic determines that a user is near a photo-active painted surface, and is performing gestures on or at an image displayed on painted surface, the user's gestures and context (i.e., location to surface, attention directed to surface, image displayed on surface, etc.) are interpreted by processing logic as potential gestures (processing block 306). As discussed above, the potential gestures may be formal, trained, natural, user interface control, or other types of gestures. In one embodiment, processing logic compares the analysis of the monitored data to determine a motion signature for a potential gesture given the potential gesture's context. Processing logic may compare the determined motion signature against a database of different gestures to see if the gesture is one recognized by processing logic.

In one embodiment, processing logic detects potential gestures via a camera of a PSDS. In one embodiment, processing logic additionally and/or alternatively detects potential gestures based on images generated on a photo-active painted surface. When processing logic of a PSDS expects to see a particular pattern on a photo-active painted surface, such as the pattern created by an image the PSDS is displaying, any differences in intensity of the pattern from what the PSDS expects to see can be interpreted by processing logic as a potential gesture. For example, a user blocking something until it fades out could be a gesture to PSDS to stop refreshing that part of the image. In this example, PSDS need not determine what blocked the light (e.g., a hand, a book, etc.), but only that the blocking happened and where it happened relative to a photo-active painted surface and a displayed image.

If a user gesture is not detected (processing block 306), processing logic returns to block 302 to continue monitoring input data. However, if a gesture is detected (processing block 306), processing logic processes the detected gesture (processing block 308). For example, the gesture processed by processing logic may correspond with text entry on a painted surface, commands associated with the text entry, commands directed to various connected systems, or interactions with an image/video displayed on a photo-active painted surface.

Processing logic then generates a display or update, if any, on a PSDS painted surface (processing block 310). In one embodiment, the gesture determined at block 308 may cause an update or change to an image being displayed on a photo-active painted surface. For example, processing logic may persist gesture initiated text entry, may recognize the gesture text entry or drawing and replace it, may update a display based on received control commands, etc.

In one embodiment, processing logic drives a spatial EM modulator to generate the display on photo-active paint. Furthermore, in one embodiment, the display continues to be displayed for a period of time based on the photo-active paint's chemistry, even when the EM modulator is obstructed. That is, because photo-active paint's reaction to stimulation by the EM modulator causes photo-active paint to display the image, even when an object (i.e., a person, object, animal, etc.) obstructs a line of sight between the spatial EM modulator and the photo-active painted surface, the photo-active paint continues to persist and display the images for a period of time.

Figure 4:
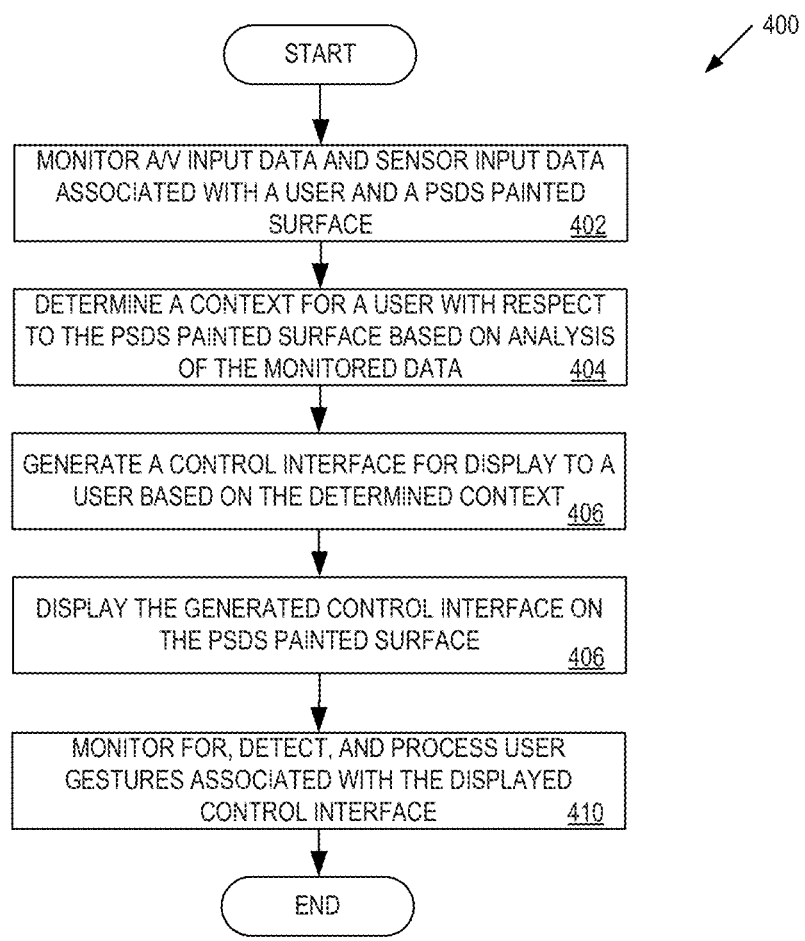
FIG. 4 is a flow diagram of one embodiment of a method for enabling gesture-based interactions with a control panel displayed on a photo-active painted surface.

FIG. 4 is a flow diagram of one embodiment of a method 400 for enabling gesture-based interactions with a control panel displayed on a photo-active painted surface. The method 400 is performed by processing logic that may comprise hardware (circuitry, dedicated logic, etc.), software (such as is run on a general purpose computer system or a dedicated machine), firmware, or a combination. In one embodiment, the method 400 is performed by PSDS 120 or PSDS 220.

Referring to FIG. 4, processing logic begins by monitoring one or more of A/V input data and sensor data associated with a user and a PSDS painted surface (processing block 402). As discussed above, the monitored data may include one or more of audio data, visual data, and sensor data that captures different users, and their respective movements/gestures performed relative to a photo-active painted surface.

Processing logic determines a context for a user with respect to the photo-active painted surface based on analysis of the monitored data (processing block 404). In one embodiment, processing logic may perform one or more of voice recognition, image recognition, motion recognition, etc. to identify a specific user, the user's location with respect to the painted surface, and whether their movement, pose, and attention are moving toward the painted surface.

After processing logic analyzes the user context information, processing logic generates a control interface for display to the user based on the determined context (processing block 406). In one embodiment, the context may indicate that a user is approaching a photo-active painted surface, and processing logic generates a just-in-time control interface when the user reaches the painted surface. In one embodiment, the context information may also specify different control interfaces based on an identity of the user, a location of the user relative to different locations of the painted surface, etc. In one embodiment, where a control panel is already displayed on a painted surface, as the user approaches the control panel, processing logic could determine that the control panel should be enlarged.

Furthermore, the control panel determined to be generated and/or displayed by processing logic may be determined, based on context information, to offer controls to one more connected systems. For example, context information indicative of a user approaching a painted surface in a home where the user is identified as a resident of the home, may cause display controls for interacting with a home lighting system, home security system, and home entertainment system to be generated. In contrast, if the context information indicates that a different user, who is not a resident of the home, approaches the wall, only the home entertainment system control interface is generated. In the embodiments discussed herein, different control interfaces may be generated based on context, including but not limited to, relative position to a painted surface, user identity, permissions set within a PSDS, etc.

Processing logic displays the control panel on the painted surface (processing block 406). Processing logic then monitors for, detects, and processes gestures associated with the displayed control interface (processing block 410). In one embodiment, the monitoring, detecting, and processing of gestures is performed as discussed above.

Figure 5:
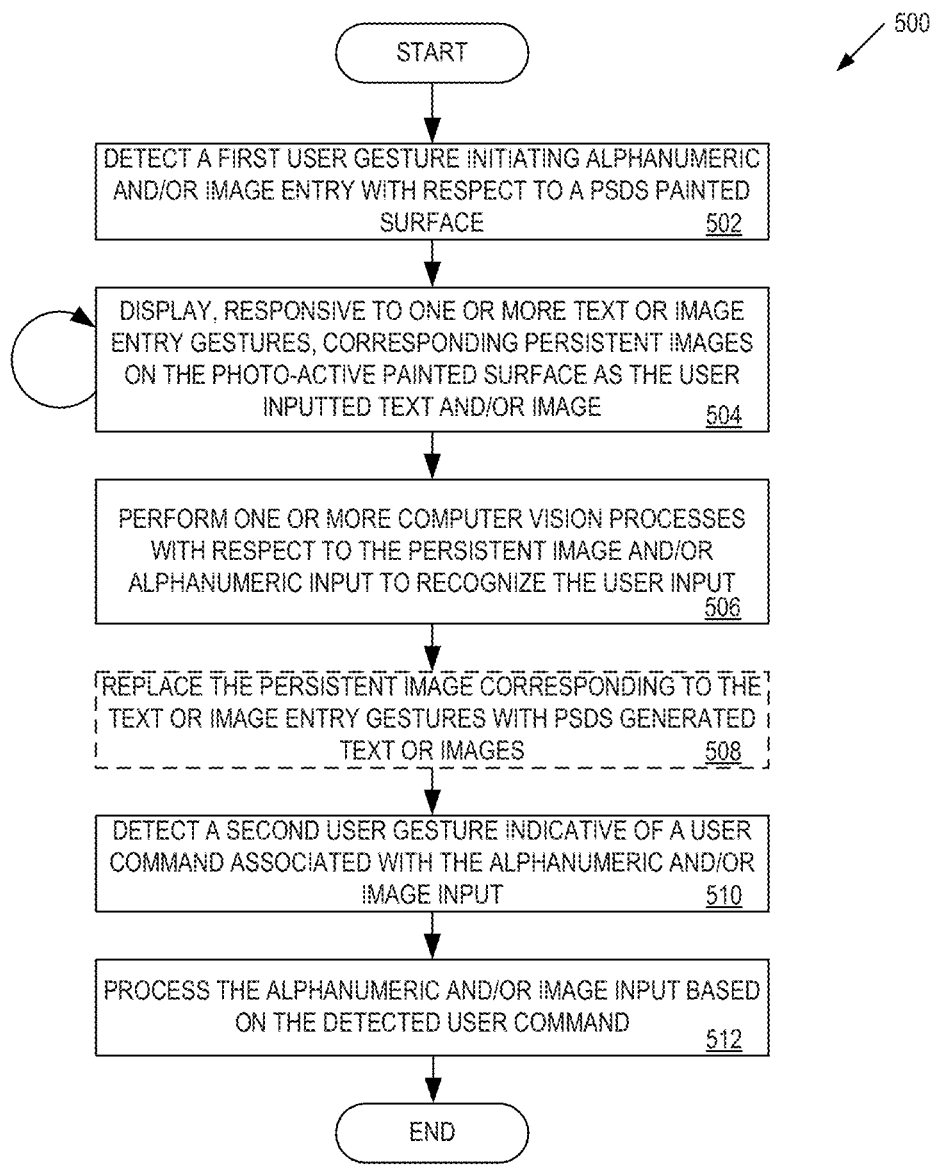
FIG. 5 is a flow diagram of one embodiment of a method for enabling gesture-based text entry and drawing on a photo-active painted surface.

FIG. 5 is a flow diagram of one embodiment of a method 500 for enabling gesture-based text entry and drawing on a photo-active painted surface. The method 500 is performed by processing logic that may comprise hardware (circuitry, dedicated logic, etc.), software (such as is run on a general purpose computer system or a dedicated machine), firmware, or a combination. In one embodiment, the method 500 is performed by PSDS 120 or PSDS 220.

Referring to FIG. 5, processing logic begins by detecting a first user gesture initiating alphanumeric and/or image entry with respect to a photo-active painted surface (processing block 502). In one embodiment, a PSDS system may include one or more stored gesture-based commands for initiating text or drawing input on a photo-active painted surface. In one embodiment, the gesture-based command may be a formal gesture, a learned gesture, or initiated via a user interface control panel. In one embodiment, a natural gesture, such as detecting a user drawing or writing on a photo-active painted surface, is sufficient to initiate the text and/or image entry.

Processing logic displays, responsive to one or more text and/or image entry gestures, persistent images on the photo-active painted surface as the user-inputted text and/or image (processing block 504). In the embodiments discussed herein, reference to drawing or text entry does not require a user to actually draw on the painted surface with a pen, pencil, brush, or the like. Rather, the processing logic of a PSDS (PSDS 120 or 220) tracks the user's hand position and may generate a corresponding image on photo-active painted surface corresponding to the user's drawing or writing gestures relative to the surface. For example, when a user's hand gestures indicate the drawing of a circle on a specific position on a photo-active painted surface, processing logic would generate and persist an image of the circle on the surface at the location where the user performed the gestures.

Processing logic performs one or more computer vision processes with respect to the persistent image and/or alphanumeric input to recognize the user input (processing block 506). For example, processing logic may perform image recognition to identify a user drawing as a circle, smiling face, a rendition of the Mona Lisa, etc. As another example, optical character recognition could be performed on alphanumeric user input to recognize the specific text being entered/drawn by a user.

In one embodiment, processing logic optionally replaces the persistent image corresponding to the text or image entry gestures with PSDS generated text or images (processing block 508). In one embodiment, alphanumeric entry subject to optical character recognition could be replaced with a clear type font version of the input. Similarly, PSDS generated images could replace user entered drawings. For example, the user drawn circle could be replaced with a perfect circle, or the user drawn Mona Lisa could be replaced with an image of Leonardo da Vinci's Mona Lisa.

Processing logic then detects a second user gesture indicative of a user command associated with the user inputted text and/or image (processing block 510). In one embodiment, the command may be one of a save, erase, move, or other command. In one embodiment, the command may also include a command to transmit the text and/or drawings to a remote system, such as a user computer system of remote server. Processing logic processes the user inputted text and/or images based on the detected user command (processing block 512).

Figure 6:
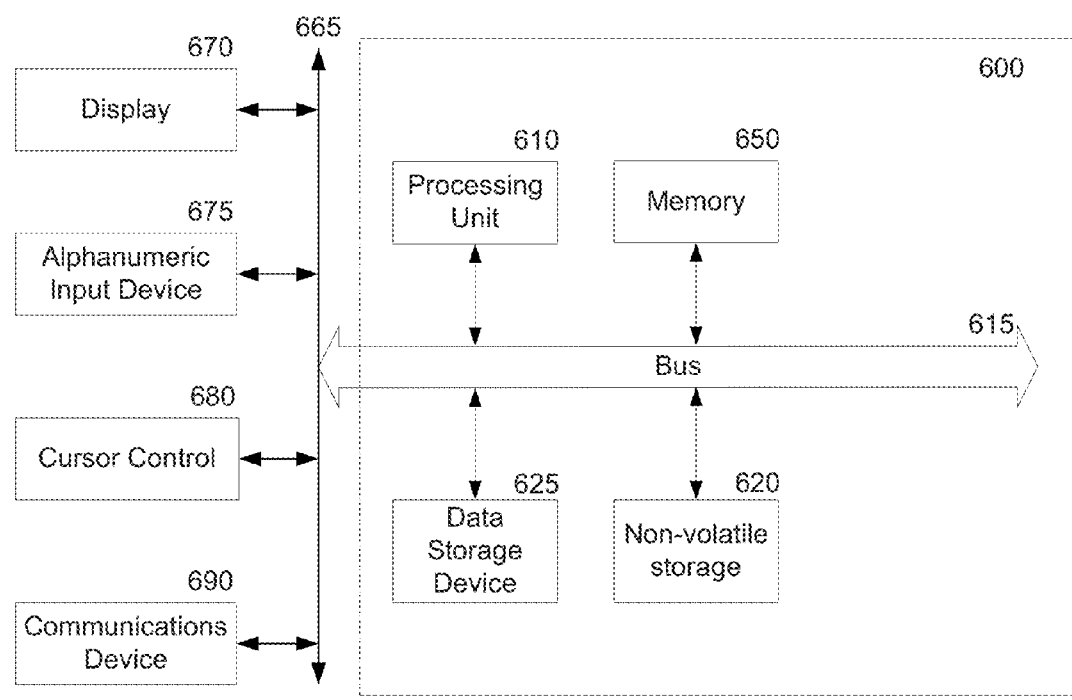
FIG. 6 illustrates a diagrammatic representation of a machine in the exemplary form of a computer system.

FIG. 6 is one embodiment of a computer system that may be used with the present invention. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a cathode ray tube (CRT) or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments of the present invention.

It will be appreciated by those of ordinary skill in the art that any configuration of the system may be used for various purposes according to the particular implementation. The control logic or software implementing the present invention can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The present invention may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A method, comprising:
    driving a spatial electromagnetic modulator to emit electromagnetic stimulation in the form of an image to cause photo-active paint to display the image;
    capturing, with at least a camera of a painted surface display system, image data of the image displayed on the photo-active paint applied to a surface and a user motion performed relative to the image, wherein the image displayed on the photo-active paint persists for a period of time even when the user motion obstructs a path between the spatial electromagnetic modulator and the image displayed on photo-active paint;
    analyzing the captured image data to determine a sequence of one or more physical movements of the user relative to the image displayed on the photo-active paint;
    determining, based on the analysis, that the user motion is indicative of a gesture; and
    processing data by the painted surface display system based on the determined gesture.

2. The method of claim 1, further comprising:
    determining a real-world context associated with the user based on results of the analysis of the sequence of one or more physical movements of the user relative to the image in the captured image data;
    generating a control interface for display on the photo-active paint applied to the surface based on the determined real-world context; and
    driving the spatial electromagnetic modulator to emit electromagnetic stimulation in the form the generated control interface to cause the photo-active paint to display an image of the control interface.

3. The method of claim 2, wherein the real-world context includes one or more of the user's movement relative to the surface, the user's position relative to a plurality of different locations of the surface, a determined identify of the user, a determination of the user's direction of attention relative to the surface, or one or more user control interface preferences.

4. The method of claim 2, wherein the determined gesture is a gesture to interact with a control in the displayed image of the control interface, further comprising:
    driving the spatial electromagnetic modulator to emit electromagnetic stimulation in the form of an update to the image to cause the photo-active paint to display an updated image of the control interface.

5. The method of claim 1, further comprising:
    transmitting the processed data to a remote system.

6. The method of claim 5, wherein the remote system is one of a remote server, a home entertainment system, home security system, or a lighting control system.

7. The method of claim 4, wherein the image displayed on photo-active paint applied to the surface is an image of a page from a book, the determined gesture is a gesture to change which page of the book is displayed, and the update to the image is the display of an image of a new page in the book.

8. The method of claim 4, further comprising:
    detecting that the user motion indicative of the gesture is indicative of a data entry gesture; and
    driving the spatial electromagnetic modulator to emit electromagnetic stimulation in the form of the detected data entry to cause the photo-active paint to display the data entry as the update to the image.

9. The method of claim 8, further comprising:
    detecting a second user motion indicative of a second gesture, the second gesture a command to be applied to the data entry; and
    performing the command on data entered with the data entry gesture.

10. The method of claim 8, wherein the data entry is text entry, further comprising:
    performing optical character recognition on the text entry; and
    driving the spatial electromagnetic modulator to emit electromagnetic stimulation in the form a clean type font version of the text entry to cause the photo-active paint to display the clean type font version of the text entry.

11. The method of claim 8, wherein the data entry is entry of a user generated drawing, further comprising:
    performing image recognition analysis on the user generated drawing;
    determining a second version of the user generated drawing based on results of the image recognition analysis; and
    driving the spatial electromagnetic modulator to emit electromagnetic stimulation in the form the second version of the user generated drawing to cause the photo-active paint to display the second version of the user generated drawing.

12. The method of claim 1, further comprising:
    analyzing a second image drawn on the photo-active paint applied to a surface by a hand-held electromagnetic modulator within the captured image data; and
    analyzing the second image to determine whether the second image is indicative of a gesture.

13. The method of claim 1, wherein the gesture is one of a formal gesture, a user-created gesture, a natural gesture, or a user-interface control gesture.

14. A non-transitory computer readable storage medium including instructions that, when executed by a processor, cause the processor to perform a method comprising:
- driving a spatial electromagnetic modulator to emit electromagnetic stimulation in the form of an image to cause photo-active paint to display the image;
- capturing, with at least a camera of a painted surface display system, image data of the image displayed on the photo-active paint applied to a surface and a user motion performed relative to the image, wherein the image displayed on the photo-active paint persists for a period of time even when the user motion obstructs a path between the spatial electromagnetic modulator and the image displayed on photo-active paint;
- analyzing the captured image data to determine a sequence of one or more physical movements of the user relative to the image displayed on the photo-active paint;
- determining, based on the analysis, that the user motion is indicative of a gesture; and
- processing data by the painted surface display system based on the determined gesture.

15. The non-transitory computer readable storage medium of claim 14, further comprising:
- determining a real-world context associated with the user based on results of the analysis of the sequence of one or more physical movements of the user relative to the image in the captured image data;
- generating a control interface for display on the photo-active paint applied to the surface based on the determined real-world context; and
- driving the spatial electromagnetic modulator to emit electromagnetic stimulation in the form the generated control interface to cause the photo-active paint to display an image of the control interface.

16. The non-transitory computer readable storage medium of claim 14, wherein the image displayed on photo-active paint applied to the surface is an image of a page from a book, the determined gesture is a gesture to change which page of the book is displayed, and the update to the image is the display of an image of a new page in the book.

17. The non-transitory computer readable storage medium of claim 14, further comprising:
- detecting that the user motion indicative of the gesture is indicative of a data entry gesture;
- driving the spatial electromagnetic modulator to emit electromagnetic stimulation in the form the detected data entry as the update to the image to cause the photo-active paint to display the data entry.

18. The non-transitory computer readable storage medium of claim 17, wherein the data entry is text entry, further comprising:
- performing optical character recognition on the text entry; and
- driving the spatial electromagnetic modulator to emit electromagnetic stimulation in the form a clean type font version of the text entry to cause the photo-active paint to display the clean type font version of the text entry.

19. The non-transitory computer readable storage medium of claim 1, further comprising:
- analyzing a second image drawn on the photo-active paint applied to a surface by a hand-held electromagnetic modulator within the captured image data; and
- analyzing the second image to determine whether the second image is indicative of a gesture.

20. A painted surface display system comprising:
- a display engine to drive a spatial electromagnetic modulator to emit electromagnetic stimulation in the form of an image to cause photo-active paint to display the image;
- an audiovisual capture device to capture image data of an image displayed on the photo-active paint applied to a surface and a user motion performed relative to the image with at least a camera of the painted surface display system, wherein the image displayed on the photo-active paint persists for a period of time even when the user motion obstructs a path between the spatial electromagnetic modulator and the image displayed on photo-active paint;
- a gesture recognition engine to analyze the captured image data to determine a sequence of one or more physical movements of the user relative to the image, and determine, based on the analysis, that the user motion is indicative of a gesture; and
- a control engine to process data based on the determined gesture.

* * * * *